US008119193B2

(12) United States Patent
Vallauri et al.

(10) Patent No.: US 8,119,193 B2
(45) Date of Patent: Feb. 21, 2012

(54) METHOD AND DEVICE FOR COATING THE JUNCTION AREA BETWEEN AT LEAST TWO ELONGATED ELEMENTS, IN PARTICULAR BETWEEN ELECTRIC CABLES

(75) Inventors: Ubaldo Vallauri, Monza (IT); Francesco Portas, Quattordio (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 1031 days.

(21) Appl. No.: 11/665,993

(22) PCT Filed: Oct. 27, 2004

(86) PCT No.: PCT/IB2004/003523
§ 371 (c)(1),
(2), (4) Date: Feb. 26, 2008

(87) PCT Pub. No.: WO2006/046089
PCT Pub. Date: May 4, 2006

(65) Prior Publication Data
US 2008/0257259 A1    Oct. 23, 2008

(51) Int. Cl.
*B05D 3/00* (2006.01)
*B23P 19/02* (2006.01)

(52) U.S. Cl. .......... 427/117; 427/140; 427/284; 29/235; 29/239

(58) Field of Classification Search .................. 427/117, 427/140, 284; 29/235, 239; 174/24, 29, 174/84 R
See application file for complete search history.

(56) References Cited

U.S. PATENT DOCUMENTS

| | | | | |
|---|---|---|---|---|
| 3,824,331 A | * | 7/1974 | Mixon et al. .................. | 174/135 |
| 3,946,480 A | * | 3/1976 | Dienes ............................. | 29/235 |
| 4,503,105 A | * | 3/1985 | Tomioka ....................... | 428/36.9 |
| 5,486,388 A | * | 1/1996 | Portas et al. .................. | 428/34.9 |
| 5,495,650 A | * | 3/1996 | Crepel et al. .................... | 29/235 |
| 5,577,310 A | * | 11/1996 | Cheenne-Astorino et al. | 29/235 |
| 5,844,170 A | * | 12/1998 | Chor et al. .................. | 174/74 A |
| 6,472,600 B1 | | 10/2002 | Osmani et al. | |

FOREIGN PATENT DOCUMENTS

| | | |
|---|---|---|
| DE | 198 20 869 | 1/1999 |
| EP | 0 541 000 | 5/1993 |
| EP | 0 917 269 | 5/1999 |
| EP | 1 037 352 | 9/2000 |

* cited by examiner

*Primary Examiner* — Brian K Talbot
(74) *Attorney, Agent, or Firm* — Finnegan, Henderson, Farabow, Garrett & Dunner, L.L.P.

(57) ABSTRACT

A method of coating the junction area between elongated elements, in particular between electric cables. This method includes the steps of: arranging a rigid tubular support having two axially separable tubular halves; mounting an elastic tubular sleeve in an elastically radially expanded condition on an outer surface of the support; interposing a lubricating material between the support and sleeve; arranging a circumferentially continuous sealing element between the halves to prevent the lubricant from percolating between the halves; positioning the support around the junction area; and moving the halves apart from each other to enable the sleeve to collapse on the junction area. A device for coating the junction area between elongated elements and a method of making the device and a joint for electric cables.

5 Claims, 7 Drawing Sheets

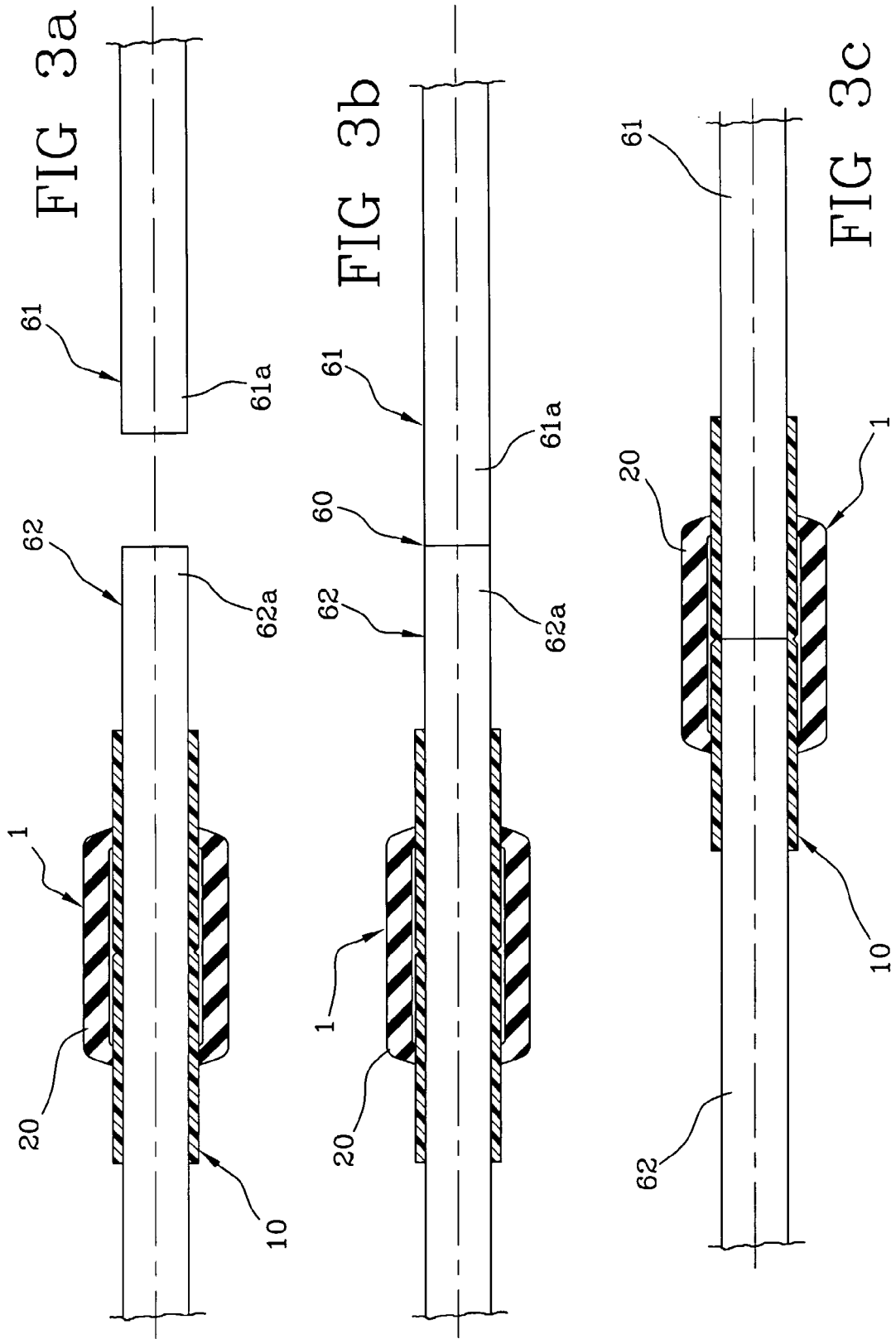

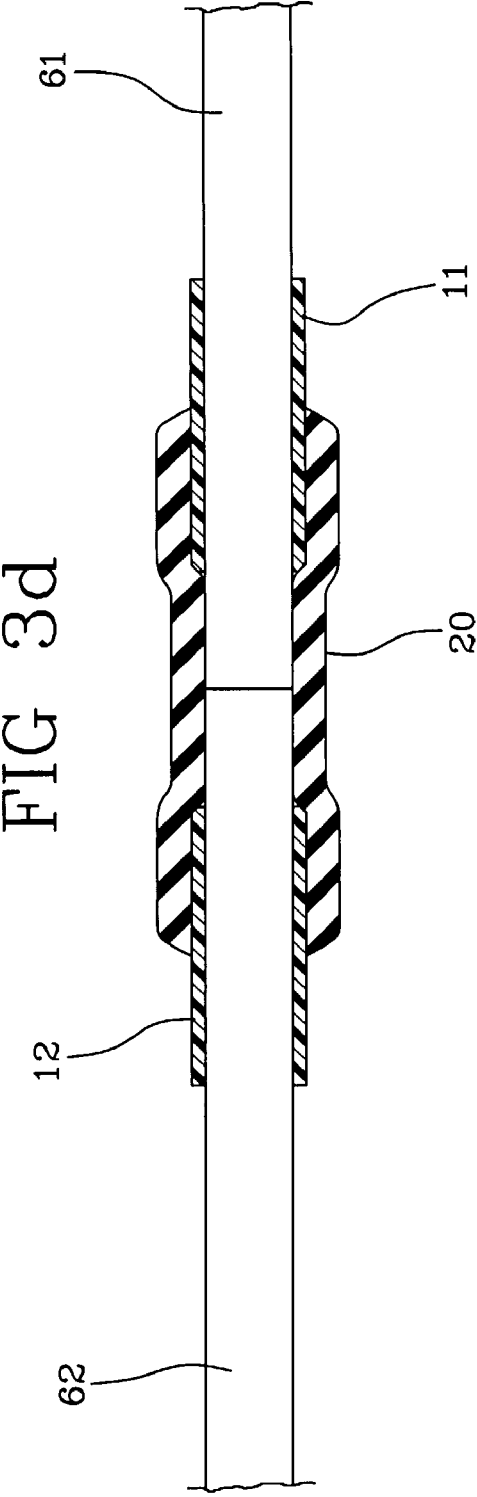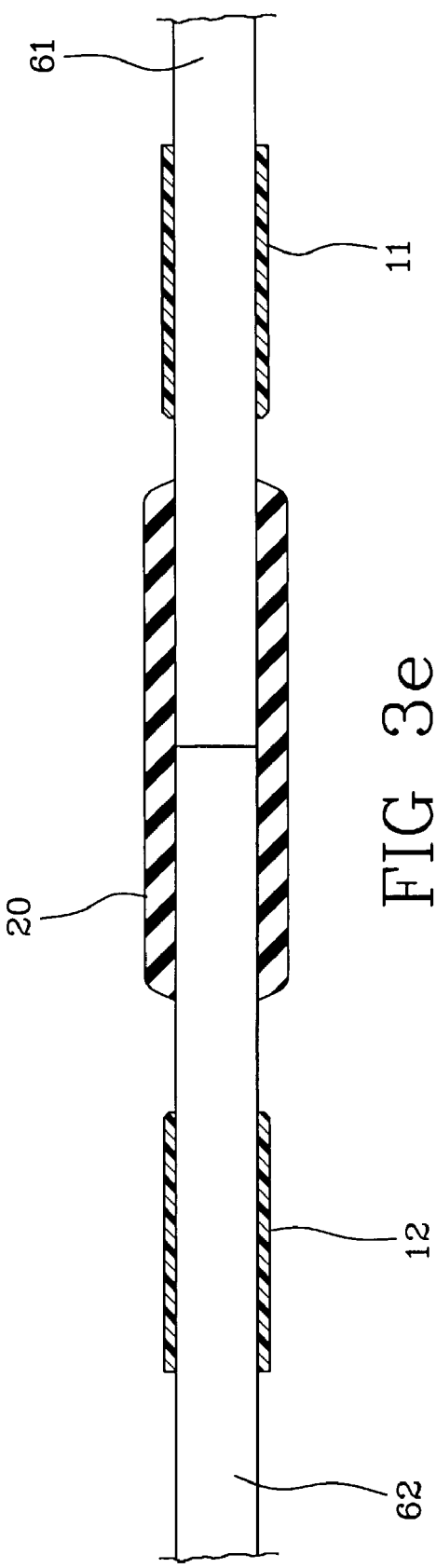

FIG 4
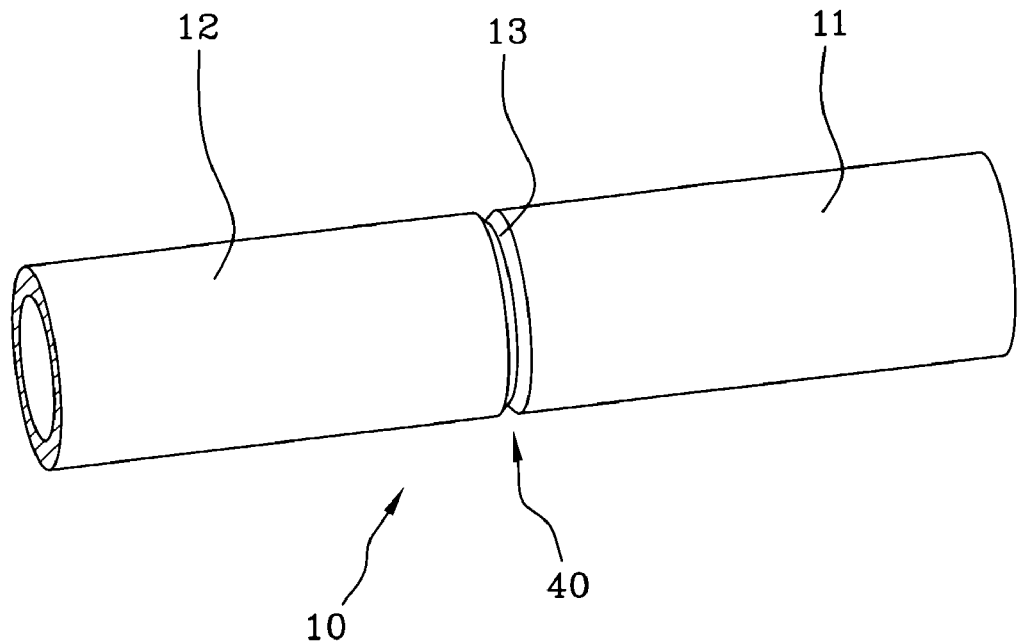
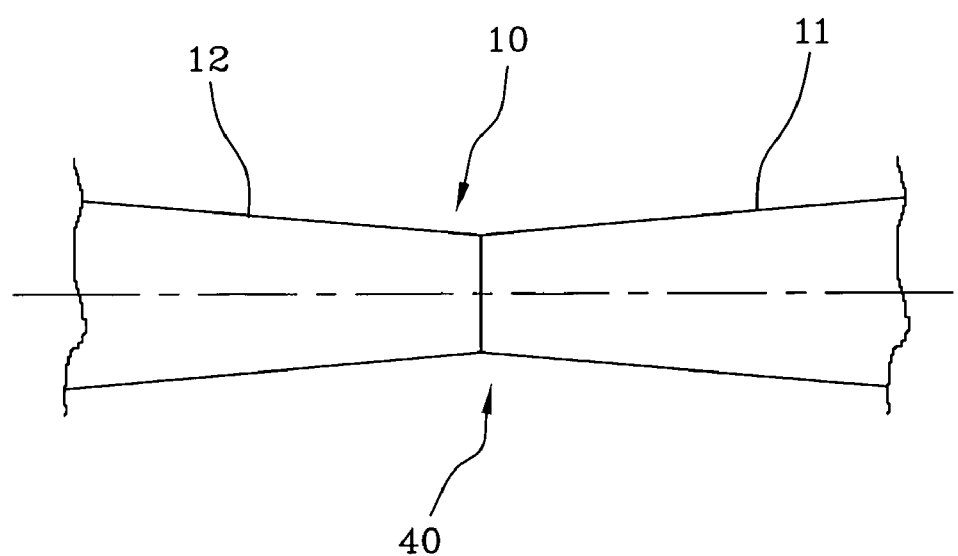
FIG 7

METHOD AND DEVICE FOR COATING THE JUNCTION AREA BETWEEN AT LEAST TWO ELONGATED ELEMENTS, IN PARTICULAR BETWEEN ELECTRIC CABLES

CROSS REFERENCE TO RELATED APPLICATION

This application is a national phase application based on PCT/IB2004/003523, filed Oct. 27,2004, the content of all of which is incorporated herein by reference.

BACKGROUND OF THE INVENTION

1. Field of the Invention

The present invention relates to a method and a device for coating the junction area between at least two elongated elements. In particular, the present invention relates to a method and a device for coating the junction area between at least two elongated elements by application of an elastic tubular sleeve.

In more detail, the present invention relates to a method and a device for coating the junction area between two electric cables.

It is a further object of the present invention to provide a joint for electric cables comprising a device for coating the junction area between said cables.

2. Description of the Related Art

In the specific case of junctions between electric cables, the device of the invention can be used for low-, medium- or high-voltage cables. Preferably, this device is used for coating the junction area between medium- and high-voltage cables.

Generally, application of an elastic tubular sleeve in the junction area between two elongated elements is obtained by use of a rigid tubular support that can be preferably separated into two halves, on which the sleeve is positioned in a radially expanded condition.

The sleeve expanded on said support is first fitted on one end of one of the elongated elements and, once junction of said elongated elements or of part of the constituent elements thereof has been carried out, the support is caused to slide on the elongated element until bringing the sleeve in register with the junction area itself.

In the preferred case in which the support consists of two halves, once the sleeve is positioned at the junction area, the two halves are released from each other and axially moved apart so as to enable the sleeve to adhere to the underlying elongated elements at the junction area of same.

The two halves, before separating and moving apart from each other, can be maintained in mutual engagement through different typologies of constraints or links.

For example, the European Patent EP 917,269 shows a "trigger" connection in which a toothed ring, made at one end of a first half, engages a corresponding circumferential groove made at the axially faced end of a second half.

To facilitate mutual separation of the two halves, use of auxiliary elongated elements is provided, each of which has a first portion extending along the outer surface of one half and inserted between said half and the sleeve fitted thereon, and a second portion, contiguous to the first one that, stepping over the end profile of said half, axially extends within the half itself, afterwards projecting at least partly from the axially opposite end.

The above mentioned European patent further describes a mutual engagement between the halves that is obtained through a circumferential weakening line defined by through holes of different sizes.

An alternative structure facilitating removal of the two halves is described in the European Patent EP 541,000 and the U.S. Pat. No. 6,472,600 both in the name of the same Applicant, according to which each half has a continuous helical cut defining a spiralled tape that is gradually removed by the operator by exerting a pulling action on the tape itself or on grip elements connected with said tape, said tape or grip elements such projecting from the outer end of each half that gradual removal of the support (and consequent collapsing of the sleeve on the junction area) is carried out starting from the centre of the junction area.

In said U.S. Pat. No. 6,472,600 it is further contemplated that one of the two halves be provided, at one of its ends, with a plurality of protuberances extending in an inclined direction relative to the longitudinal axis of the support, whereas the other half has a plurality of corresponding recesses matching the shape of said protuberances.

In this way the two halves are maintained in mutual engagement, forming a single piece until the moment the sleeve, that is disposed in an expanded condition on the corresponding support, is positioned at the junction area. Subsequently, at the moment said halves must be separated, it is required that one half be rotated relative to the other around its longitudinal axis to disengage the above mentioned protuberances from the respective recesses.

A further embodiment described in said US patent consists in providing a frangible ring for connection between the two support halves, said ring being obtained through formation of through slits or welding points. In compliance with this embodiment, separation of the two halves is achieved by use of a string fastened to the ring itself and pulling of which by the operator triggers breaking of said ring thereby causing mutual moving away of said halves in an axial direction.

In order to promote mutual moving apart of the two halves, and in particular sliding of the halves relative to the sleeve, use of a lubricating material interposed between the support and sleeve may be provided. This lubricating material is applied at the moment the sleeve is positioned on the support in an expanded condition.

The Applicant could ascertain that the technical solutions adopted in the known art to link the two support halves together are not able to ensure that the lubricating material will remain correctly positioned between the support and sleeve until the sleeve is applied onto the junction area. In fact it is to be noted that generally between manufacturing of the junction device and use of said device medium-long periods of time even in the order of some months may elapse.

In particular, the Applicant has ascertained that if a support previously made up of two parts or separable into two halves at the moment of being extracted, is wished to be used, the solutions known in the art contemplate circumferential discontinuities causing percolation of the lubricant through the faced surfaces of the two halves so that, as a result, the lubricant is no longer in the region where it had been originally applied.

Lack of lubrication, even if partial, during the support-ejection step represents an important problem because it causes an unacceptable increase in the ejection times and can even involve stopping of said step.

SUMMARY OF THE INVENTION

The Applicant therefore has become aware of the fact that, in order to ensure an efficient lubricating action of the contact surface between the sleeve and the support, at the moment said support is arranged at a junction area between two elongated elements, it is necessary to ensure a uniform and homogeneous distribution of the lubricating material at the sleeve-support interface, without the occurrence of undesirable migrations and percolations of the lubricating material itself at the coupling region between the two halves constituting the support itself, also in the presence of particularly prolonged storage times.

The Applicant has found that this problem can be advantageously resolved by arranging a circumferentially continuous annular sealing element between the two support halves, which element is able, on the one hand, to prevent the lubricating material from percolating between the two halves and, on the other hand, to allow easy mutual disassembling of said halves.

In particular, it is an aim of the present invention to provide a method of coating the junction area between at least two elongated elements, in particular between electric cables, comprising the following steps: setting a rigid tubular support consisting of two axially separable tubular halves, arranging a circumferentially continuous annular sealing element between said halves; mounting an elastic tubular sleeve in an elastically radially expanded condition on an outer surface of said support; interposing a lubricating material between said support and sleeve; positioning said support provided with said sleeve around said junction area; moving said halves away from each other to enable collapsing of said elastic tubular sleeve on said junction area.

Another aim of the present invention consists in providing a device for coating the junction area between at least two elongated elements, in particular between electric cables, comprising: a rigid tubular support consisting of two tubular axially separable halves; an elastic tubular sleeve mounted, in an elastically radially expanded condition, on an outer surface of said support; a lubricating material interposed between said support and sleeve; a circumferentially continuous annular sealing element interposed between said halves to prevent said lubricant from percolating between said halves.

It is a further aim of the present invention to provide a joint for electric cables comprising: a rigid tubular support consisting of two tubular axially separable halves; an elastic tubular sleeve mounted, in an elastically radially expanded condition, on an outer surface of said support and comprising at least one electrical-insulation layer; a lubricating material interposed between said support and sleeve; a circumferentially continuous annular sealing element interposed between said halves to prevent said lubricant from percolating between the halves themselves.

Further features and advantages will become more apparent from the detailed description of a preferred but not exclusive embodiment of a method and a device for coating the junction area between at least two elongated elements, in particular between electric cables, as well as of a joint for electric cables in accordance with the present invention.

BRIEF DESCRIPTION OF THE DRAWINGS

This description will be set out hereinafter with reference to the accompanying drawings, given by way of non-limiting example, in which:

FIGS. 3a-3e show the operating steps of the method of coating the junction area between two elongated elements in accordance with the invention;

FIG. 4 is a diagrammatic perspective view of a support of the device in FIG. 1;

FIG. 7 is a partial side view of a support being part of the junction device shown in FIG. 6;

Figure 1:
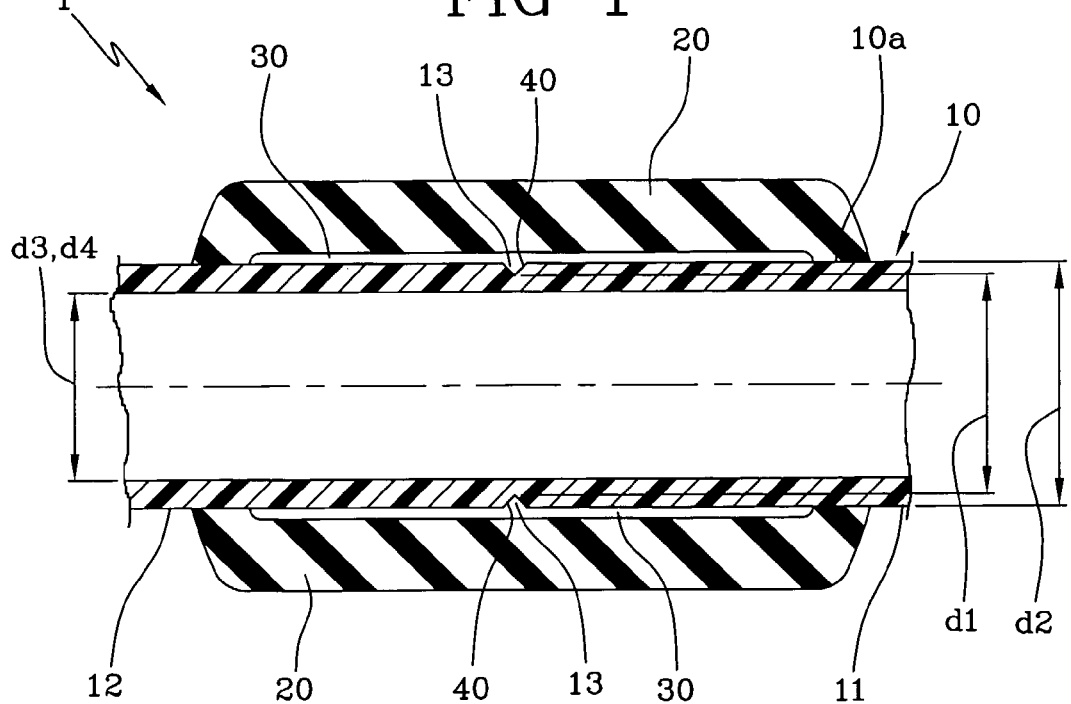
FIG. 1 is a partial longitudinal section view of a first embodiment of a device in accordance with the invention.

With reference to the drawings, a junction device in accordance with the invention to coat the junction area between at least two elongated elements has been generally identified with reference numeral 1.

In compliance with the invention, the above mentioned elongated elements can be selected among electric cables, pipelines, electric terminals and possible combinations thereof, for example.

DETAILED DESCRIPTION OF THE INVENTION

The elongated elements, denoted at 61, 62 are only shown in FIGS. 3a-3e, for the sake of clarity.

The junction area 60 between the elongated elements 61, 62 can consist both of the area where two electric cables or two pipelines are mutually engaged, and of the connection area between a cable and a respective electric terminal.

Device 1 (see FIG. 1, in particular) comprises a rigid tubular support 10 adapted to be axially separated into two tubular halves 11. 12.

Support 10 can be made of a rigid plastic material such as polyethylene, propylene or polyvinylchloride, for example. Halves 11, 12 can have a cylindrical conformation. Alternatively, halves 11, 12 have a frustoconical conformation. In the last-mentioned case halves 11, 12 axially face themselves at their minor bases.

Fitted at the radially outer surface of support 10 is an elastic tubular sleeve 20 in a condition of radial elastic expansion.

Advantageously, sleeve 20 is positioned on both halves 11, 12 at the facing region thereof. Preferably, sleeve 20 is symmetrically disposed relative to said facing region of said halves.

Sleeve 20 is a cold-shrinkable sleeve, i.e. it is able to collapse on the junction area by virtue of the elastic properties of the materials of which it is made.

Depending on the applications for which it is designed (as a protection for the junction area between two pipelines or between two electric cables, for example), sleeve 20 can be made of different materials. The instance of a sleeve 20 set to be used for coating and protecting the junction area between two electric cables will be analysed herebelow.

Interposed between the support 10 and sleeve 20 is a lubricating material 30 that, as better explained in the following, facilitates mutual moving away of halves 11, 12 of the support 10 and consequent application of sleeve 20 to the junction area 60. The lubricating material 30 can be oil or grease. Preferably, lubricant 30 is a silicone-base grease or a polyalkylenglycol-base grease, advantageously with addition of a filler comprising talc in a proportion of 15-35% by weight for example, and preferably containing at least an additive capable of giving said grease a resistance to pressure. Preferably, said additive is boron nitride. Preferably, said additive is in a proportion of 2 to 10% by weight.

The used grease is such selected that it does not flow away from the junction area following the hooping force exerted by the elastic sleeve 20 during the storage period of device 1, which period can be included just as an indication, between six months and three years.

In addition, the used grease must form a continuous lubricating layer over the whole outer surface 10a of support 10, in spite of the pressure exerted on sleeve 20. This pressure can be included between 5-6 bars ($5\times10^5$-$6\times10^5$ Pa) and even reach higher values, until about 15 bars ($15\times10^5$ Pa) for example.

In compliance with the present invention, a circumferentially continuous sealing element 40 is provided between the first and second halves 11, 12 which will be able, on the one hand, to allow separation and subsequent moving away of the two halves once the tubular sleeve has been positioned at the junction area, and on the other hand, to prevent the lubricant 30 from percolating between said halves 11, 12.

Preferably, the sealing element 40 is made of one piece with at least one of the halves 11, 12 of support 10. In particular, in compliance with the first embodiment shown in FIG. 1 and the second embodiment shown in FIG. 2, the sealing element 40 is made of one piece with both halves 11, 12 and is substantially coaxial with said halves.

In more detail, in the first embodiment shown in FIG. 1 the inner diameter d3 of the sealing element 40 is substantially the same as the inner diameter d4 of support 10, whereas the outer diameter d1 of the sealing element 40 is smaller than the outer diameter d2 of support 10.

In accordance with this embodiment, the sealing element 40 is advantageously obtained through formation of a groove 13 in the outer surface 10a of support 10, this groove 13 defining the above mentioned two distinct halves 11, 12.

The residual thickness at groove 13 (given by the difference between d1 and d3) defines said circumferentially continuous sealing element 40 of the junction device in accordance with the invention.

Figure 2:
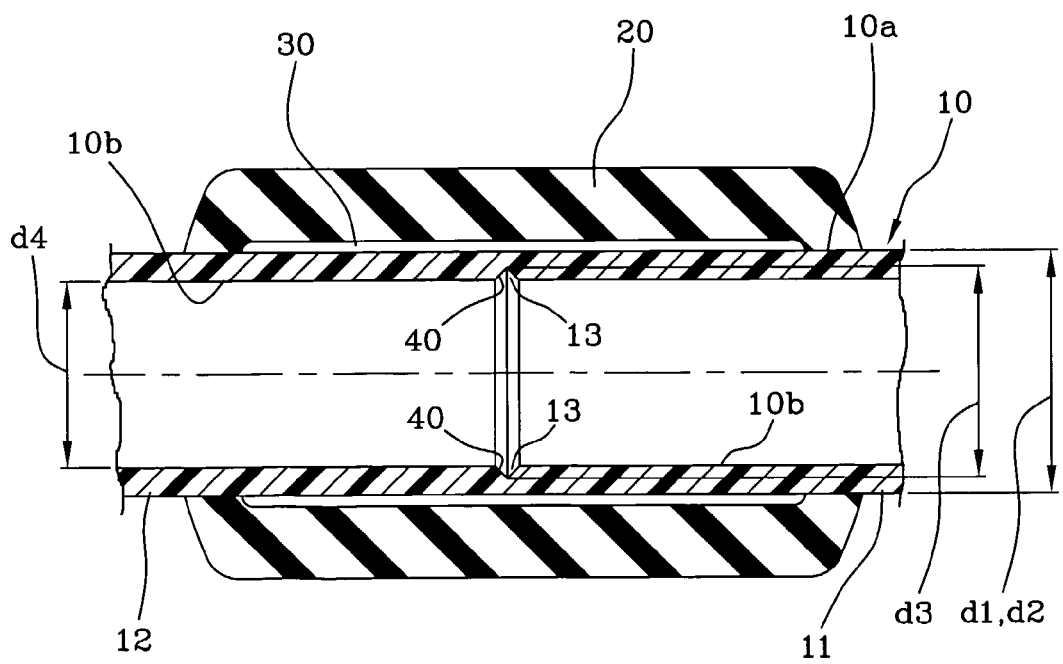
FIG. 2 is a partial longitudinal section view of a second embodiment of a device in accordance with the invention.

In a second embodiment shown in FIG. 2, groove 13 is formed in the inner surface 10b of support 10. In this case, the inner diameter d3 of the sealing element 40 is bigger than the inner diameter d4 of support 10, and the outer diameter d1 of the sealing element 40 is substantially the same as the outer diameter d2 of support 10.

The residual thickness at groove 13, given by the difference between the outer diameter d1 and inner diameter d3 of the sealing element 40, defines the circumferentially continuous sealing element 40 of the junction device in accordance with the invention.

The residual thickness is preferably included between 0.05 mm and 0.5 mm. More preferably, the residual thickness is 0.1 mm.

Advantageously, sleeve 20 is positioned at the groove 13; preferably, said sleeve is axially centred relative to said groove 13.

In a third embodiment (shown in FIG. 5a) and a fourth embodiment (shown in FIG. 5b), the sealing element 40 comprises a first portion 41 and a second portion 42. More particularly, the first portion 41 is made of one piece with the first half 11 of support 10 and the second portion 42 is made of one piece with the second half 12. Said first and second portions 41, 42 of the sealing element 40 axially face each other to form a labyrinth profile preventing percolation of the lubricant 30 between portions 41, 42 and therefore between halves 11, 12.

To the aims of the present description, the expression "labyrinth profile" means any non-rectilinear profile formed in the thickness of the support 10 and adapted to determine a tortuous path capable of restricting or preventing flowing of a fluid along the path itself.

In compliance with the present invention, this profile can have an at least partly curvilinear conformation.

Alternatively, this profile is provided with a plurality of portions to define a broken line.

The labyrinth profile as above defined allows one or more protuberances/recesses to be set that are able to substantially prevent or restrict migration of lubricant 30 to the sleeve/support interface.

Figure 5A:
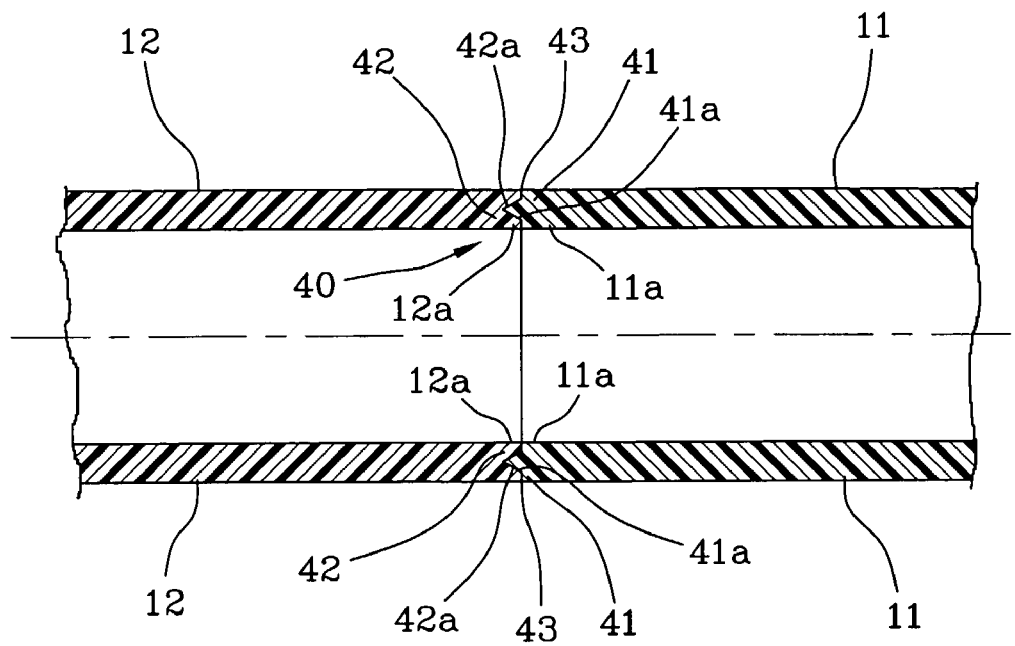
FIG. 5a is a partial longitudinal section view of a third embodiment of a support being part of the junction device of the invention.

For example, as shown in FIG. 5a, the first portion 41 of the sealing element 40 has a circumferentially continuous protuberance 41a projecting from an axial end 11a of the first half 11, whereas the second portion 42 has a circumferentially continuous cavity 42a formed at an axial end 12a of the second half 12.

Protuberance 41a and cavity 42a suitably conform in shape to define a mutual engagement between the first and second halves 11, 12. According to this embodiment the labyrinth profile consists of a broken line.

Figure 5B:
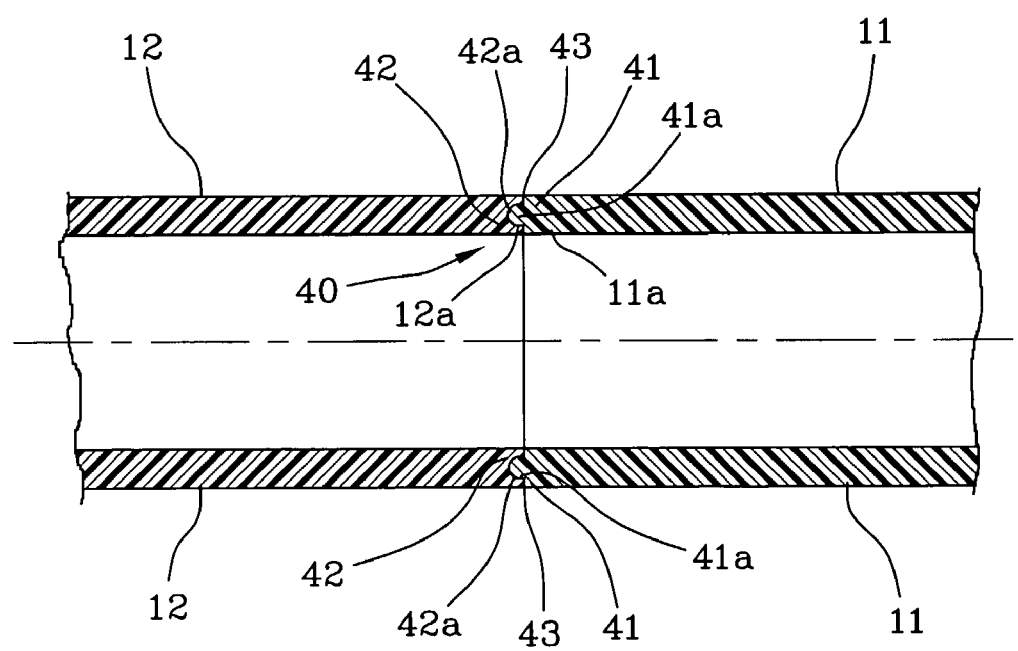
FIG. 5b is a partial longitudinal section view of a fourth embodiment of a support being part of the junction device of the invention.

Shown in FIG. 5b is a further embodiment of said labyrinth profile according to which, at the protuberance 41a and the cavity 42b, the profile has a substantially curvilinear conformation.

For the purpose of making the drawings simpler and clearer, the elongated elements joined to each other are not shown in FIGS. 5a and 5b, neither shown is sleeve 20 positioned at the contact surface between the portions 41, 42 of the sealing element 40.

Figure 6:
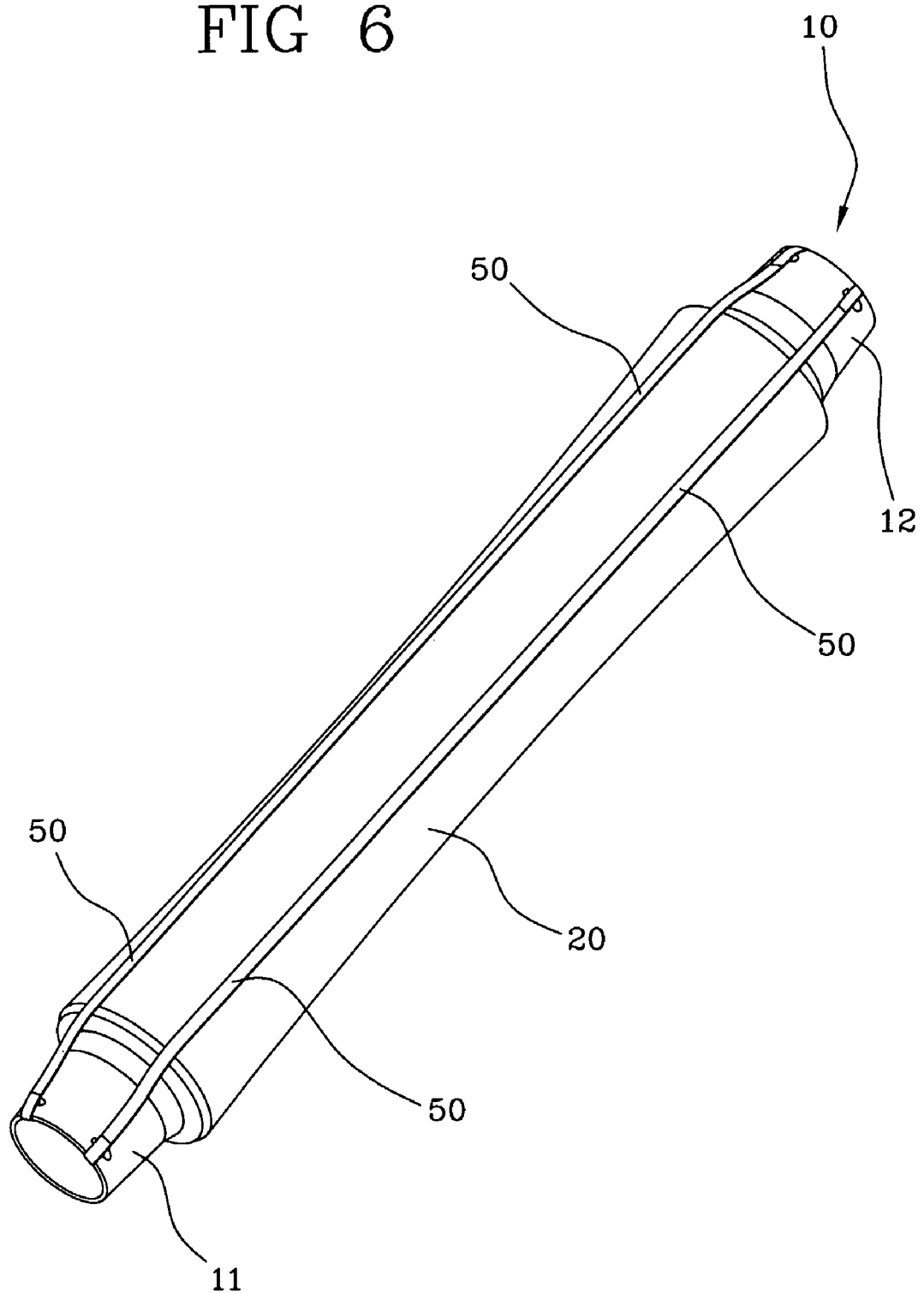
FIG. 6 is a diagrammatic perspective view of the devices shown in FIGS. 5a and 5b.

Should the sealing element 40 consist of the two portions 41, 42 made of one piece with the first and second halves 11, 12 of support 10 respectively, the junction device 1 would be conveniently provided with pulling elements 50 (FIG. 6) exerting a suitable axial force on the two halves 11, 12 capable of maintaining portions 41, 42 in a condition of mutual axial contact.

These pulling elements 50, preferably made in the form of ribbon elements of polypropylene, polyesters or metal, are linked to axially opposite ends of halves 11, 12 and prevent the latter from moving away from each other thereby starting the shrinkage step of the sleeve before the junction device is correctly disposed at the junction area of the elongated elements 61, 62.

In particular, these pulling elements 50 exert a constraint on halves 11, 12 to such an extent that the axial force of mutual approach exerted on said halves 11, 12 is greater than the axial component of the elastic shrinkage force exerted by sleeve 20 on support 10.

In other words, the pulling elements 50 are submitted to a tension preferably included between about 30 N and about 200 N, more preferably included between about 60 N and about 100 N.

The junction device hitherto described lends itself to be used for putting into practice a method of coating the junction area between at least two elongated elements in accordance with the present invention.

In compliance with the invention, this method the operating sequence of which is diagrammatically shown in FIGS. 3a-3e, contemplates the starting step of inserting the junction device 1 around one of the elongated elements 61, 62 to be joined and positioning this device in a non-operating condition on said element until the junction operation has been carried out.

In more detail, as shown in FIG. 3a, device 1 is fitted around the elongated element 62 in such a manner that the end 62a of said elongated element 62 axially projects from support 10 and is therefore available for the operator so that it can perform the junction operation. Diagrammatically shown in FIG. 3b is the junction step between said two elongated elements 61, 62.

When the junction operation has been completed, there is a step of making device 1 axially slide along the elongated element 62 until bringing sleeve 20 close to the junction area 60, as shown in FIG. 3c.

Once device 1 is correctly positioned, the two halves 11, 12 are axially moved apart from each other so as to enable the elastic shrinkage of sleeve 20 at the junction area 60.

At this point depending on the type of support used, the moving-apart step in accordance with the method of the present invention can be performed following different operating modes.

For instance, if the first or second embodiments shown in FIGS. 1 and 2 respectively are used, the operator exerts a bending force on support 10 so as to start breaking of the weakened region of the support 10 defined by the sealing element 40, and therefore enable separation of the two halves 11, 12. Preferably, this bending force is applied by the operator close to the axial ends of support 10. Advantageously, this bending force is exerted in at least two different application directions so as to carry out full breaking of said weakened region.

If, on the contrary, the third or fourth embodiments shown in FIGS. 5a and 5b respectively are used, the method in accordance with the invention contemplates the step of disengaging the pulling elements 50 from halves 11, 12 (by cutting said pulling elements 50, for example) so that the elastic shrinkage of sleeve 20 on support 10 causes a progressive ejection of the two halves 11, 12 out of the junction area 60.

If halves 11, 12 of support 10 have a frustoconical conformation (as shown in FIG. 7), this ejecting action is advantageously backed up by the geometry of said halves.

If, on the contrary, halves 11, 12 have a cylindrical conformation, exerting an initial bending force on said halves may be required—preferably at the facing region of the latter—in order to start separation of the two halves 11, 12 and enable collapsing of sleeve 20 on the junction area 60. The hooping action due to the elastic shrinkage force of sleeve 20 on support 10 enables mutual moving apart of halves 11, 12 from the junction area to be completed, once the ejection process has been triggered, without any further application of said pulling force being necessary.

Once halves 11, 12 have been ejected (see FIG. 3e), they are removed from the welded elongated elements 61, 62 by any operation suitable for the purpose, through cutting of said halves for example.

As above mentioned, in a particular application scope of the present invention each of the elongated elements 61, 62 is represented by an electric cable.

Figure 8:
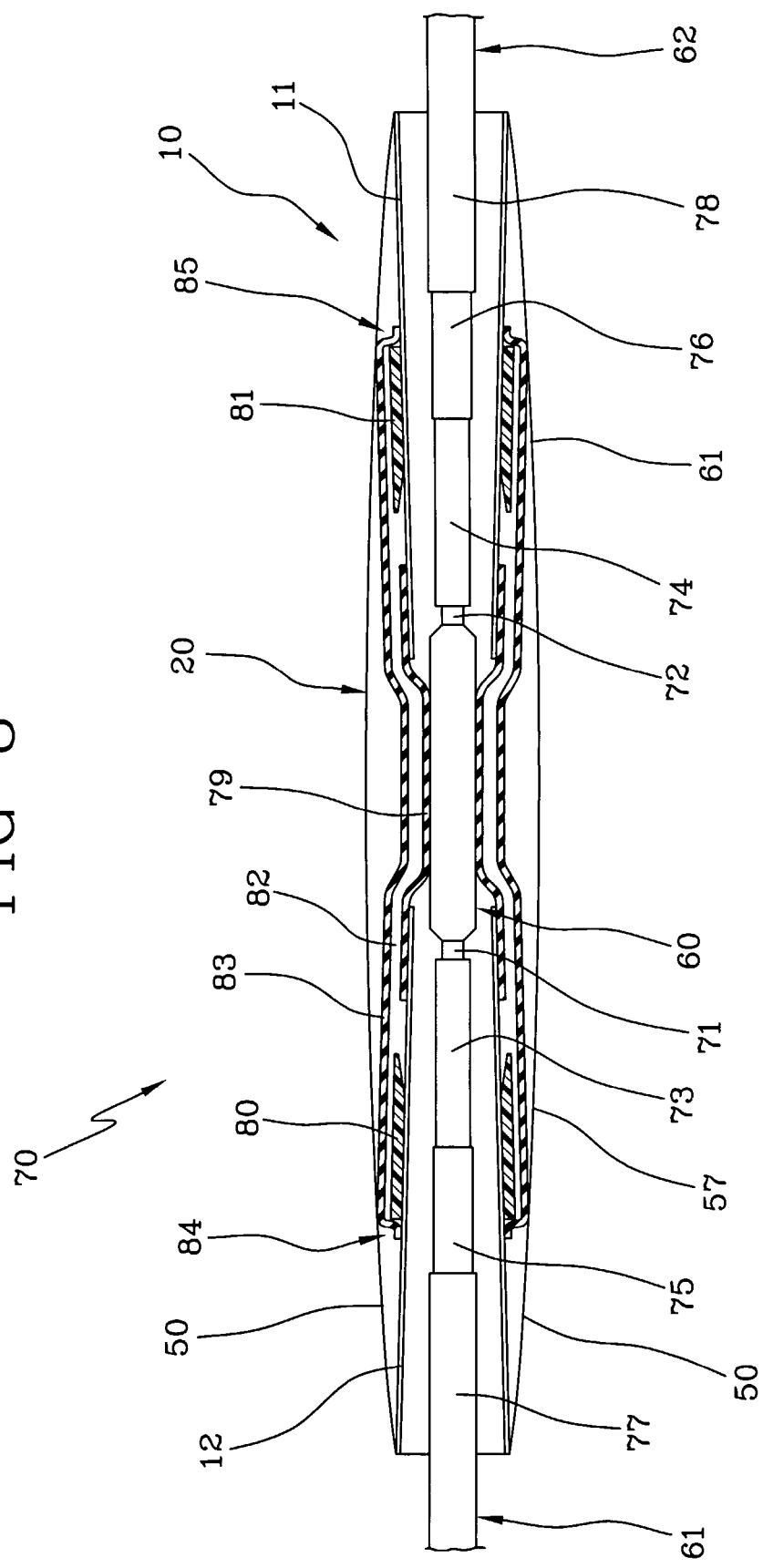
FIG. 8 is a partial longitudinal section view of a joint for electric cables in accordance with the invention.

Shown in FIG. 8 is a joint 70 according to the present invention, said joint comprising the junction device 1 as above described for carrying out junction between two high voltage electric cables 61, 62.

In the present description the term "medium voltage" means a voltage typically included between about 1 kV and about 30 kV, whereas the term "high voltage" means a voltage typically higher than about 30 kV.

As shown in FIG. 8, cables 61 and 62, starting from a radially internal position towards a radially external position, are provided respectively of: a metal conductor 71, 72; an inner semi-conductive layer (not shown); an insulating layer 73, 74; an outer semi-conductive layer 75, 76. The assembly of these elements is generally referred to as cable "core".

Preferably, conductors 71, 72 are made up of at least two metallic wires twisted with each other. Alternatively, said conductors are in the form of a solid rod. Preferably, conductors are made of copper or aluminium.

To the aims of the present description, the term "electric insulation material" is used to indicate a material having a dielectric strength of at least 5 kV/mm, preferably higher than 10 kV/mm. For high-voltage cables, preferably said material has a dielectric strength higher than 20 kV/mm, preferably between 20 and 50 kV/mm.

Typically, the insulating layers 73, 74 have a relative dielectric constant at least as high as 2, preferably included between 2 and 5.

Preferably, the insulating layers 73, 74 are made of a polyolefin-base cross-linked polymer, in particular cross-linked polyethylene (XLPE), or of cross-linked ethylene/propylene copolymers (EPR) or ethylene/propylene/diene copolymers (EPDM).

Alternatively, said insulating layers 73, 74 are made of a thermoplastic material comprising a thermoplastic polymer, preferably a polyolefin (such as polyethylene or polypropylene), and a predetermined amount of a dielectric liquid, preferably a synthetic oil (such as an aromatic, paraffinic, naphthenic oil).

The inner semi-conductive layers (not shown) and outer semi-conductive layers 75, 76 are generally obtained by extrusion of a polymer-base material, a polyolefin for example (such as polyethylene) to which conductive carbon black is added so as to give the polymeric base the desired semi-conductive properties.

At a radially external position to said core, cables 61 and 62 are provided with a metal screen (not shown) generally made of aluminium, copper or lead.

The metal screen can consist of, for example, a plurality of wires or metal tapes helically wound around the cable core. Alternatively, the metal screen can consist of a circumferentially continuous tube, obtained starting, for example, from a metal sheet longitudinally bent to obtain a tubular conformation by welding or gluing of the side edges thereof.

The electric cables 61 and 62 further comprise an outer sheath of a polymer material 77, 78 placed in a radially external position with respect to the metal screen.

The outher sheath 77,78 is preferably made of polymer material, polyvinylchloride (PVC) or polyethylene (PE) for example, performing the function of protecting the cable core from the surrounding environment.

In FIG. 8 the junction area between two electric cables 61, 62 is generally denoted at 60 and is obtained by welding of the conductors 71, 72 of said cables, for example.

In FIG. 8 the joint 70 is shown fitted at the junction region 60 and has the function of restoring continuity of the insulating layers 73, 74 and the outer semi-conductive layers 75, 76. Therefore, joint 70 comprises a plurality of elements that are radially superposed in coaxial relationship and that correspond to the constituent elements of the cable.

In detail, joint 70 comprises the support 10, susceptible of being divided into the two halves 11, 12 (as above said), and the tubular sleeve 20 fitted on said support in an elastically radially expanded condition. For more simplicity in description, the lubricating material 30 interposed between the support 10 and sleeve 20 is not represented in FIG. 8.

In order to restore the electrical and mechanical continuity of cables 61 and 62, sleeve 20 starting from the radially innermost position to the radially outermost position, comprises:

a first semi-conductive element 79 (generally referred to as "electrode"), disposed around support 10 and substantially extending in a central position of sleeve 20, at the junction area 60;

two second semi-conductive elements 80, 81 (generally referred to as "baffles") disposed around support 10 and at the axially opposite ends of the first semi-conductive element 79;

an electric-insulation layer 82, surrounding the first semi-conductive element 79 and the second semi-conductive elements 80, 81; and a third semi-conductive element 83 to form a layer disposed at a radially external position relative to the electric-insulation layer 82, said third semi-conductive element 83 being designed (once support 10 has been removed) to connect the outer semi-conductive layers 75, 76 of cables 61, 62.

The electrode 79 is a voltage-distributing element that is positioned at the joined ends of the cables and partly overlaps the insulating layers of said cables.

The electrode is made of an electrically semi-conductive material and generates a constant-potential Faraday cage cancelling out the effects due to the presence of air and any shape unevenness present in the connecting region of conductors 71, 72.

Baffles 80, 81 have the function of making the distribution of the flux lines of the electric field uniform at the interruption of the outer semi-conductive layers of the cables. In detail, each baffle consists of a shield for control of the electric field and is positioned at the axial ends of the insulating layer.

According to a preferred embodiment, the axial ends of the third semi-conductive element 83 are preferably provided with a lip 84, 85 disposed at the axially external ends of the second semi-conductive elements 80, 81 and in contact with the support 10.

Shown in FIG. 8 is a step of the method in accordance with the invention in which halves 11, 12 are already decoupled and partly axially moved apart from each other, while sleeve 20 is collapsing on the junction area 60.

The method in accordance with the invention further comprises the step of restoring the metal screens and outer sheaths 77, 78 of the two cables 61, 62.

The metal screens can be restored by for example applying a tubular metal plait connecting the metal screen of cable 61 with the metal screen of cable 62. Preferably, the electric continuity between said metal screens is completed by superposing said tubular plait on said screens and applying a hooping element at said superposition region. Preferably, the hooping element is a metal clamp. More preferably, said hooping element is a metal spring.

The outer sheath (not shown) can be restored by providing a further elastic tubular sleeve (in a radially expanded condition) fitted on a further support that is disposed on an end of one of the two cables 61, 62. Subsequently, once sleeve 20 has been set around the junction area 60 and the metal screen has been restored, said further sleeve (i.e. the outer sheath), fitted on said further support, is disposed at the junction area 60 and collapsing thereof takes place by ejection of said further support.

Alternatively, above all if junction of two medium-voltage electric cables is to be carried out, the metal screen and outer sheath can be intended as constituent elements of sleeve 20.

The invention claimed is:

1. A method of joining at least two elongated elements, comprising the steps of:
arranging a rigid tubular support having two axially separable tubular halves;
arranging a circumferentially-continuous annular sealing element between said halves, the circumferentially-continuous annular sealing element comprising at least a first portion made integral with at least one of the two axially separable tubular halves;
mounting an elastic tubular sleeve in an elastically radially expanded condition on an outer surface of said support;
interposing a lubricating material between said support and sleeve;
positioning said support provided with said sleeve around said junction area; and
mutually moving said halves apart to enable said elastic tubular sleeve to collapse on said junction area.

2. The method as claimed in claim 1, further comprising the step of joining corresponding ends of said at least two elongated elements together.

3. The method as claimed in claim 2, wherein said step of joining the ends of the elongated elements together is performed before the step of positioning said support.

4. The method as claimed in claim 2, further comprising the step of axially inserting one of said elongated elements in said support so that the end of said elongated element axially projects from said support.

5. The method as claimed in claim 4, wherein said step of axially inserting said elongated element in said support is performed before joining the ends of said elongated elements together.

* * * * *